(12) United States Patent
Park et al.

(10) Patent No.: US 8,810,738 B2
(45) Date of Patent: Aug. 19, 2014

(54) DISPLAY APPARATUS AND MULTI DISPLAY APPARATUS HAVING THE SAME

(75) Inventors: Seon-kyu Park, Suwon-si (KR); Hyun-yong Choi, Chuncheon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1162 days.

(21) Appl. No.: 12/182,251

(22) Filed: Jul. 30, 2008

(65) Prior Publication Data

US 2009/0066606 A1 Mar. 12, 2009

(30) Foreign Application Priority Data

Sep. 10, 2007 (KR) ........................ 10-2007-0091738

(51) Int. Cl.
*H04N 5/64* (2006.01)
*E04G 3/00* (2006.01)
*H05K 7/20* (2006.01)
*G06F 1/16* (2006.01)
*H04N 9/12* (2006.01)
*G09G 5/00* (2006.01)

(52) U.S. Cl.
CPC ................ *G06F 1/1601* (2013.01); *H04N 9/12* (2013.01); *H04N 5/64* (2013.01); *G06F 2200/1612* (2013.01); *G09G 5/003* (2013.01); *G09G 2330/06* (2013.01); *G09G 2300/026* (2013.01)
USPC .......................... 348/843; 248/278.1; 361/715

(58) Field of Classification Search
CPC . G06F 1/1601; G06F 2200/1612; H04N 9/12; H04N 5/64; G09G 2330/06; G09G 5/003; G09G 2300/026

USPC ......................................................... 348/843
See application file for complete search history.

(56) References Cited

U.S. PATENT DOCUMENTS

| | | | |
|---|---|---|---|
| 6,064,565 A | 5/2000 | Ishihara et al. | |
| 6,068,227 A * | 5/2000 | Morgan et al. | ............. 248/278.1 |
| 7,864,263 B2 | 1/2011 | Kim | |
| 2002/0149543 A1 | 10/2002 | Clifton et al. | |
| 2004/0264139 A1 * | 12/2004 | Hashizume et al. | .......... 361/715 |

FOREIGN PATENT DOCUMENTS

| | | |
|---|---|---|
| CN | 1482796 A | 3/2004 |
| EP | 1722559 | 11/2006 |
| GB | 2274225 | 7/1994 |
| JP | 11-085319 | 3/1999 |
| KR | 2004-6989 | 1/2004 |

OTHER PUBLICATIONS

European Search Report dated Nov. 5, 2008 issued in EP 08163698.
Chinese Office Action issued in Chinese Patent Application No. 200810212273.7 on Aug. 25, 2011.
Chinese Office Action mailed Jun. 29, 2012 with English Translation.
Korean Office Action dated Sep. 27, 2013 issued in KR Application No. 10-2007-0091738.
Chinese Office Action dated Jan. 17, 2013 issued in CN Application No. 200810212273.7.

* cited by examiner

*Primary Examiner* — Hee-Yong Kim
(74) *Attorney, Agent, or Firm* — Stanzione & Kim, LLP

(57) ABSTRACT

A display apparatus and a multi display apparatus. The display apparatus includes a display module having an opening through which an image is displayed and a non-display area to form around the opening, and a rear cover directly coupled to a side surface of the display module. The multi display apparatus includes the plurality of display apparatuses which are coupled with each other.

16 Claims, 6 Drawing Sheets

DISPLAY APPARATUS AND MULTI DISPLAY APPARATUS HAVING THE SAME

CROSS-REFERENCE TO RELATED APPLICATIONS

This application claims priority under 35 U.S.C. §119(a) from Korean Patent Application No. 10-2007-0091738, filed on Sep. 10, 2007 in the Korean Intellectual Property Office, the disclosure of which is incorporated herein in its entirety by reference.

BACKGROUND OF THE INVENTION

1. Field of the Invention

The present general inventive concept relates to a display apparatus and a multi display apparatus having the same, and more particularly, to a display apparatus with an improved coupling structure of a display panel and a rear cover, and a multi display apparatus having the same.

2. Description of the Related Art

A conventional display apparatus, such as a television or a monitor, includes a display module, a printed circuit board which drives the display module, and a front cover and a rear cover which are coupled with each other to form an outside appearance.

A conventional assembling process of the display apparatus is as follows.

First, the front cover is coupled with the display module, and then, the printed circuit board is coupled to a rear surface of the display module.

Next, the front cover and the rear cover are coupled with each other to form the outside appearance of the display apparatus.

However, in the conventional display apparatus, a structure for coupling the front cover and the rear cover is complicated, and thus, elements for forming the outside appearance of the display apparatus are also complicated. Accordingly, manufacturing costs increase.

Recently, multi display apparatuses have become popular, and include a plurality of display apparatuses coupled with each other so as to provide a large screen for a user. In this case, it is required to minimize a non-display area in which an image is not displayed to improve a picture quality.

SUMMARY OF THE INVENTION

Accordingly, the present general inventive concept provides a display apparatus which has a simplified structure to couple a rear cover and to form an outside appearance thereof, and a multi display apparatus having the same.

The present general inventive concept also provides a display apparatus which can minimize a non-display area, and a multi display apparatus having the same.

Additional aspects of the present general inventive concept will be set forth in part in the description which follows and, in part, will be obvious from the description, or may be learned by practice of the present general inventive concept.

The foregoing and/or other aspects and utilities of the present general inventive concept are achieved by providing a display apparatus, including a display module having an opening through which an image is displayed and a non-display area to form around the opening, and a rear cover directly coupled to a side surface of the display module.

The display apparatus may further include a printed circuit board to drive the display module and may be positioned between the display module and the rear cover.

The rear cover may include metal and may be press-formed.

The display module may include a display panel to display the image, and a chassis to support the display panel.

A plurality of coupling holes may be formed in at least one side surface of the display panel and the chassis, and a plurality of through holes may be formed at the rear cover to correspond to the coupling holes.

The rear cover may be coupled with the display module by a coupling member which is coupled into each coupling hole through the display module and each through hole.

The display apparatus may further include a switch part to control power supplied to the display module and to receive an operation signal of the display module, the switch part being coupled to the display module.

The display apparatus may further include a terminal part provided to transmit power or a signal between the display module and the outside, the terminal part being coupled to at least one of the display module and the rear cover.

The foregoing and/or other aspects and utilities of the present general inventive concept can be also achieved by providing a multi display apparatus having a plurality of display apparatuses which are coupled with each other. Here, each display apparatus may include a display module having an opening through which an image is displayed and a non-display area to form around the opening, and a rear cover directly coupled to a side surface of the display module.

The display apparatus may further include a printed circuit board to drive the display module and may be positioned between the display module and the rear cover.

The rear cover may include metal and may be press-formed.

The foregoing and/or other aspects and utilities of the present invention general inventive concept can be also achieved by providing a display apparatus, including a display module, having a screen to display an image thereon, and at least one coupling hole on at least one side surface of the display module, and a rear cover with at least one through hole to correspond to the at least one coupling hole to couple the rear cover to the display module.

The display apparatus may further include at least one coupling member to couple the rear cover to the display module by insertion through both the at least one through hole and the at least one coupling hole.

The display apparatus may further include a terminal part located on a surface of the display apparatus to couple signal sending/receiving cords thereto, and a terminal opening located on a surface of the rear cover to correspond to the terminal part to allow the signal sending/receiving cords to have access to the terminal part.

The rear cover may fully cover every side of the display apparatus except the side with the screen.

The foregoing and/or other aspects and utilities of the present invention general inventive concept can be also achieved by providing a multi display apparatus, including a plurality of display modules, each having a screen to display an image thereon, and at least one coupling hole on at least one side surface of the display module, and a rear cover with at least one through hole to correspond to the at least one coupling hole to couple the rear cover to the display module, such that each of the plurality of display modules are coupled to at least one other display module.

The foregoing and/or other aspects and utilities of the present invention general inventive concept can be also achieved by providing a display apparatus, including a display module having a display panel and a terminal part, and a rear cover having a side surface to receive and surround the display module, and a terminal opening to receive the terminal part.

The terminal part may be exposed to an outside of the rear cover through the terminal opening so as to be connected to an external device.

The display module may include another side surface disposed within the side surface of the rear cover.

The display module may be disposed within the side surface of the rear cover.

The display module may include a printed circuit board mounted thereon, wherein the display panel, the printed circuit board, and the terminal part are formed in a single body, and the single body is inserted into the rear cover.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
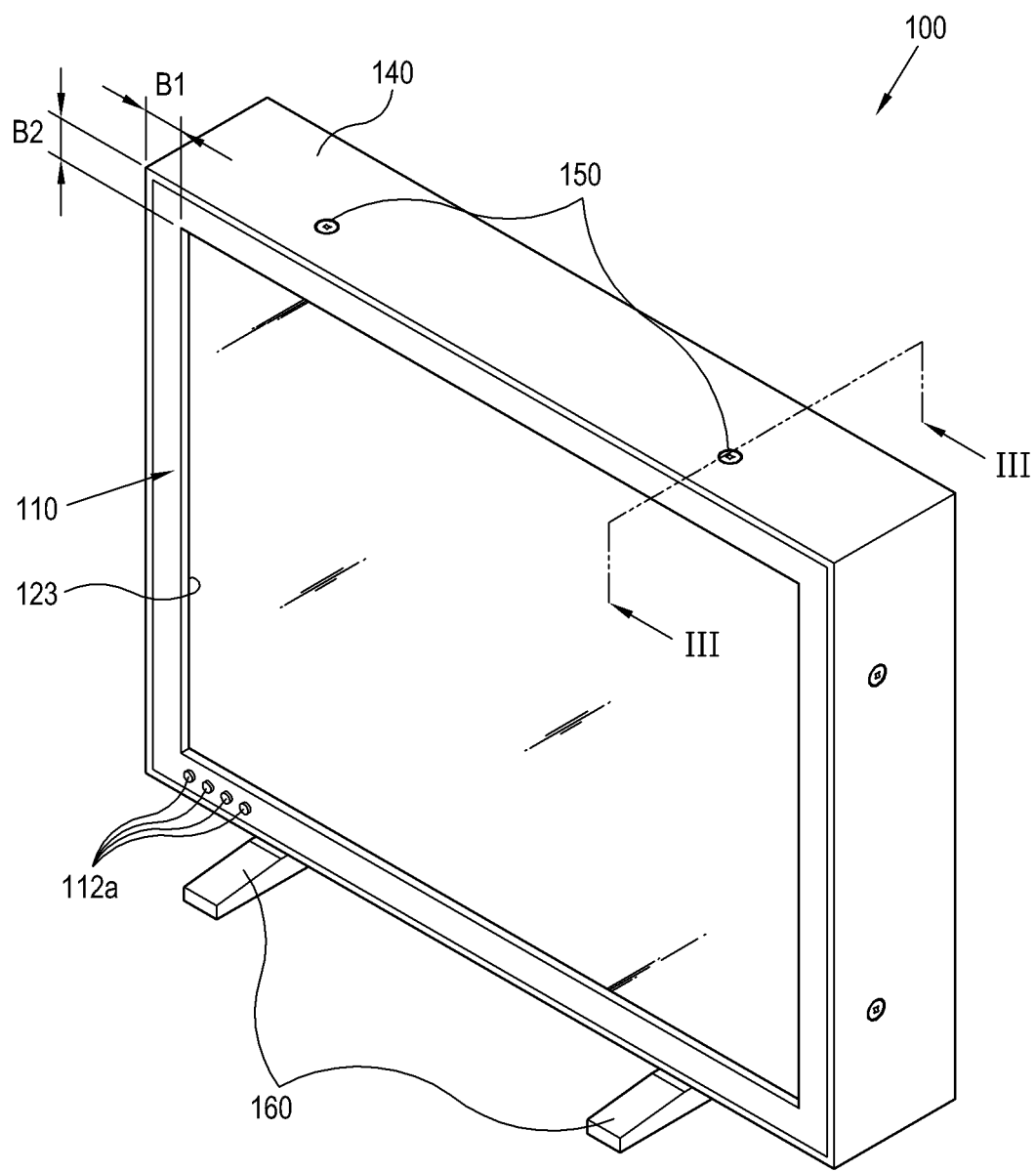
FIG. 1 is a perspective view of a display apparatus according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
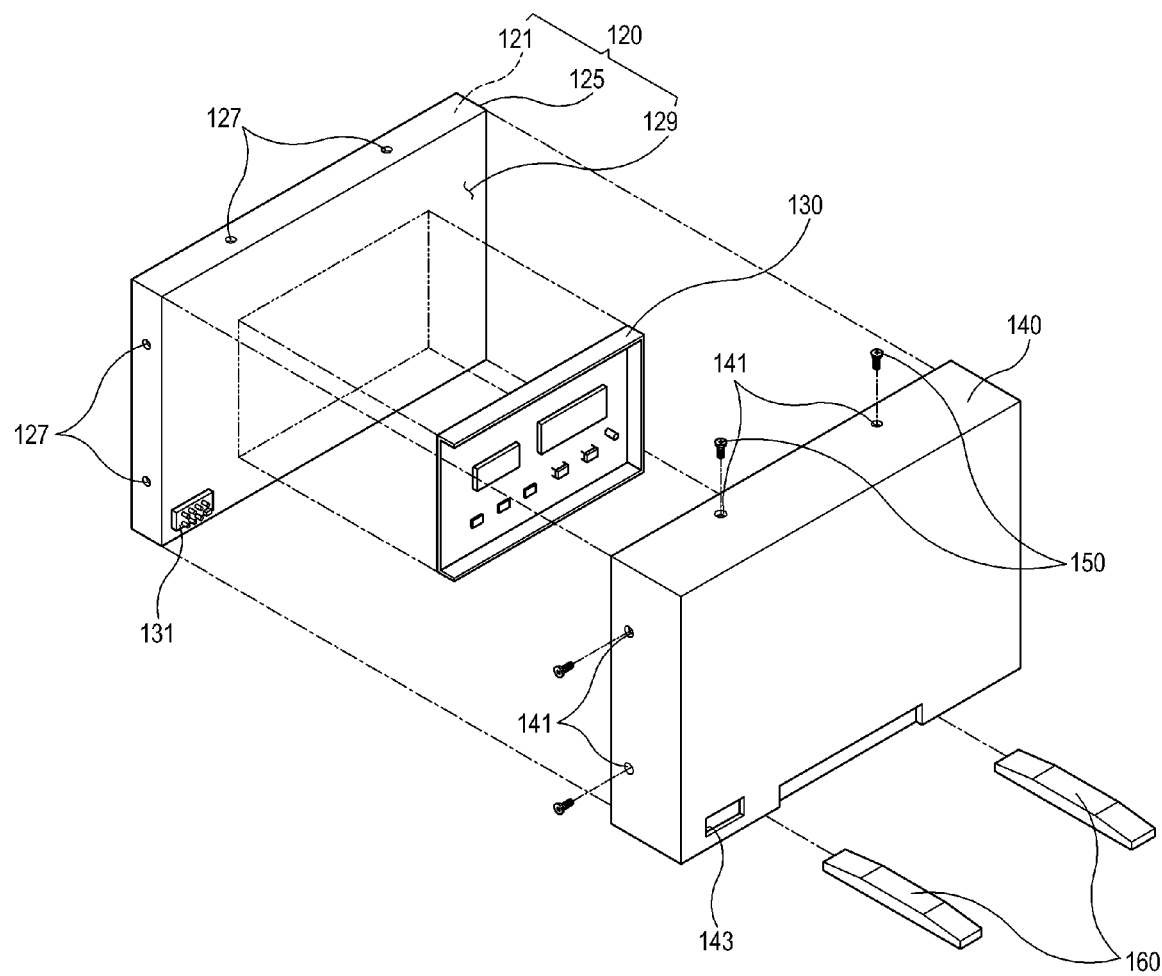
FIG. 2 is an exploded perspective view of the display apparatus in FIG. 1.
Figure 3:
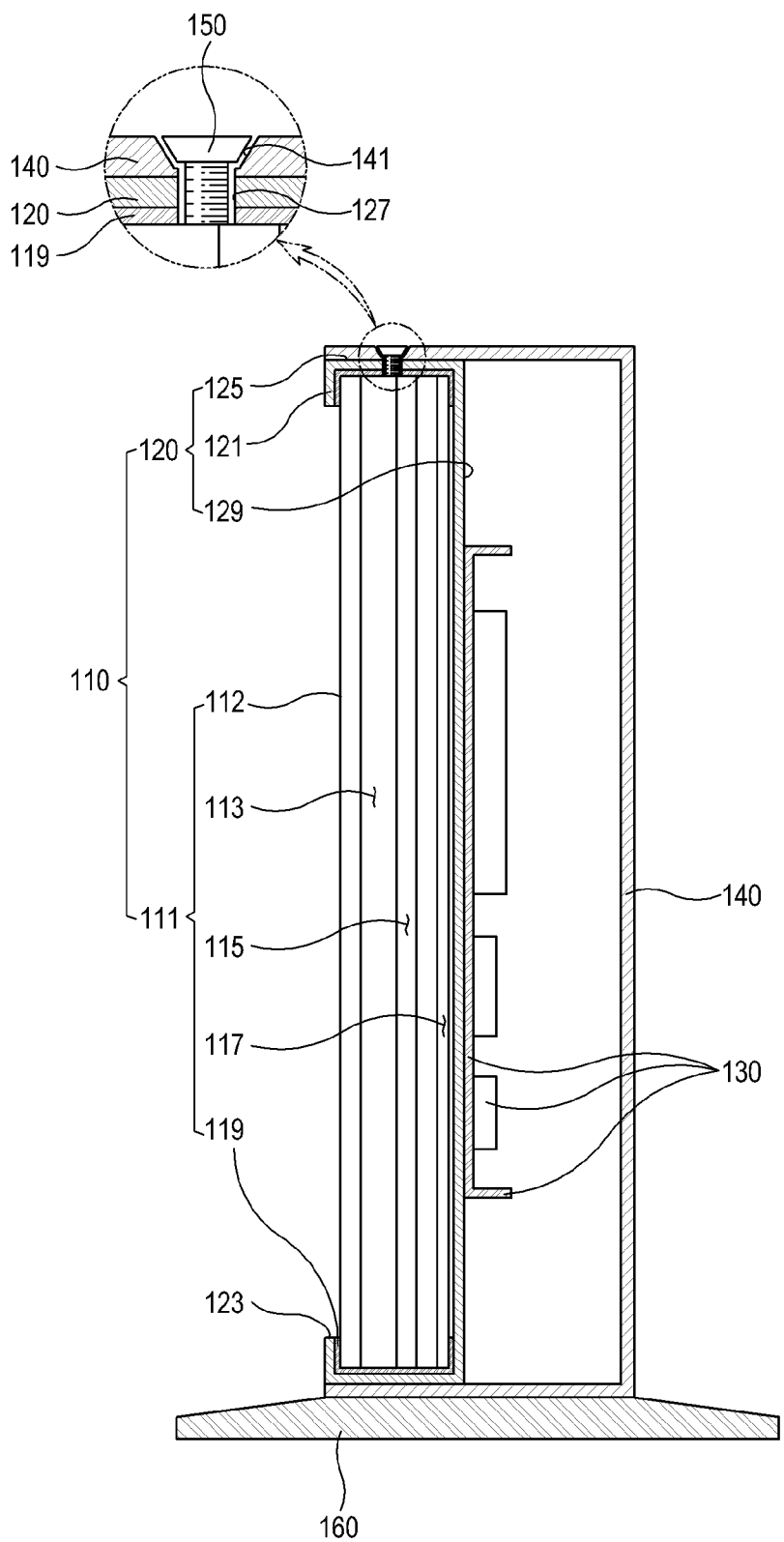
FIG. 3 is a section view of the display apparatus, taken along line III-III in FIG. 1.

Referring to FIGS. 1 to 3, a display apparatus 100 according to an exemplary embodiment of the present general inventive concept includes a display module 110 having at a front surface an opening 123 through which an image may be displayed, and a rear cover 140 which is directly coupled to a side surface of the display module 110. A non-display area around the opening 123 forms an outside appearance of the display module 110.

The display apparatus 100 further includes a printed circuit board 130 which drives the display module 110 and is coupled to a rear part of the display module 110. The printed circuit board 130 may be connected to one or more components of the display apparatus 100 and/or an external device 400 (as illustrated in FIG. 4B) to receive and/or transmit signals or data to control a display function to display an image and a control function to control functions of the display apparatus 110 and the external device 400.

The display module 110 includes a display panel 111 and a chassis 120 in which the opening 123 is formed and which supports the display panel 111. The display panel 111 may be an LCD, a plasma display unit, etc. having a screen on which an image is displayed through the opening 123.

The display panel 111 includes a display part 112 to form an image thereon. The display panel 111 further includes a film part 113 which is positioned at a rear portion of the display part 112, a light source part 115 which is positioned over the rear of the display part 112, and a reflection part 117 which is positioned at a lower side of the light source part 115. Further, the display panel 111 includes a panel frame 119 which supports the display part 112, the film part 113, the light source part 115 and the reflection part 117.

The display part 112 may include a thin film transistor substrate (not illustrated) in which a thin film transistor is formed, a color filter substrate (not illustrated) which is disposed opposite to the thin film transistor substrate, and a liquid crystal layer (not illustrated) which is formed between the substrates.

The display part 112 may adjust alignment of the liquid crystal layer to form an image. The display part 112 is made of a non-light emitting element, and thus, receives light from the light source part 115.

The film part 113 which is disposed behind the display part 112 may include, for example, a diffusion film, a prism film and a passivation film.

The light source part 115 may include a plurality of lamps which are disposed in parallel with each other to generate light. The lamps may be arranged to cover the whole rear surface of the display part 112.

The reflection part 117 is disposed at a lower side of the light source part 115 and reflects the light from the light source part 115 toward the diffusion film.

The chassis 120 forms an outside appearance of the display module 110 and is coupled with the panel frame 119. The chassis 120 includes a front surface 121 which forms a front appearance of the display module 110, a side surface 125 which is bent backward from the front surface 121, and a rear surface 129 which is extended from the side surface 125 and forms a rear appearance of the display module 110.

In the side surface 125 is formed a coupling hole 127 into which a coupling member 150 such as a screw is coupled. Alternatively, the coupling hole 127 may be formed in the panel frame 119 of the display panel 111.

On the front surface 121 is provided a switch part 112a through which an operation signal of the display module 110 is input. The switch part 112a may control power supplied to the display module 110, control one or more characteristics of the image, and change functions of the display module 110. The switch part 112a may be provided on the rear cover 140 as necessary. The switch part 112a may be connected to the display module 110 and/or the printed circuit board 130.

To the rear surface 129 is provided a terminal part 131 which transmits power or signals between the display module 110 and the outside. The terminal part 131 may include a plurality of connectors to allow various power or audio/video cables to connect thereto. A terminal opening 143 is formed on the rear cover 140 corresponding to the terminal part 131. The terminal part 131 may be provided on the rear cover 140. The terminal part 131 may be connected to the printed circuit board 130, the switch part 112a, and/or the display module 110, such that power and/or functions of the display module 110, the printed circuit board 130, and/or the switch part 112a are supplied and/or controlled.

The rear cover 140 is coupled with the side surface 125 of the display module 110. The rear cover 140 is formed with a through hole 141 corresponding to the coupling hole 127 of the chassis 120.

Accordingly, a front appearance of the display apparatus 100 is formed by the front surface 121 of the display module 110, and a side and rear appearance of the display apparatus 100 is formed by the rear cover 140.

With this configuration, the display apparatus 100 according to the present general inventive concept can directly couple the rear cover 140 to the display module 110 without a front cover, unlike the conventional display apparatus. Accordingly, the structure of coupling the rear cover 140 can be simplified, and thus, manufacturing costs thereof can be decreased.

Further, first and second widths B1 and B2 of a non-display area of the display apparatus 100 can be decreased, as illustrated in FIG. 1.

The rear cover 140 may be made of a thin metal plate by press-forming.

For example, in a 46 inch display apparatus, the rear cover 140 according to the present general inventive concept, made of the thin metal plate by press-forming, can be relatively thin in thickness compared with a rear cover made of plastic by injection-molding. More specifically, the rear cover 140, according to an embodiment of the present general inventive concept, can be made of a metal plate having a thickness of 0.8-1.0 mm, whereas the rear cover made of plastic by the injection-molding has a thickness of 2.8-3.0 mm.

Also, the metal rear cover 140 according to an embodiment of the present general inventive concept can be made at a relatively low molding cost compared with the plastic rear cover made by injection-molding.

Further, the rear cover 140 according to an embodiment of the present general inventive concept made of the metal plate can shield electromagnetic waves generated from the printed circuit board 130, which is disposed in the rear cover 140, to thereby effectively prevent EMI (Electromagnetic Interference) with a slim structure without an additional EMI preventing element.

A stand 160 may be disposed on an installation surface, such as a table, and may support the display apparatus 100.

Hereinafter, an assembling process of the display apparatus 100 having the above-described configuration will be described with reference to FIGS. 4A and 4B.

Figure 4A:
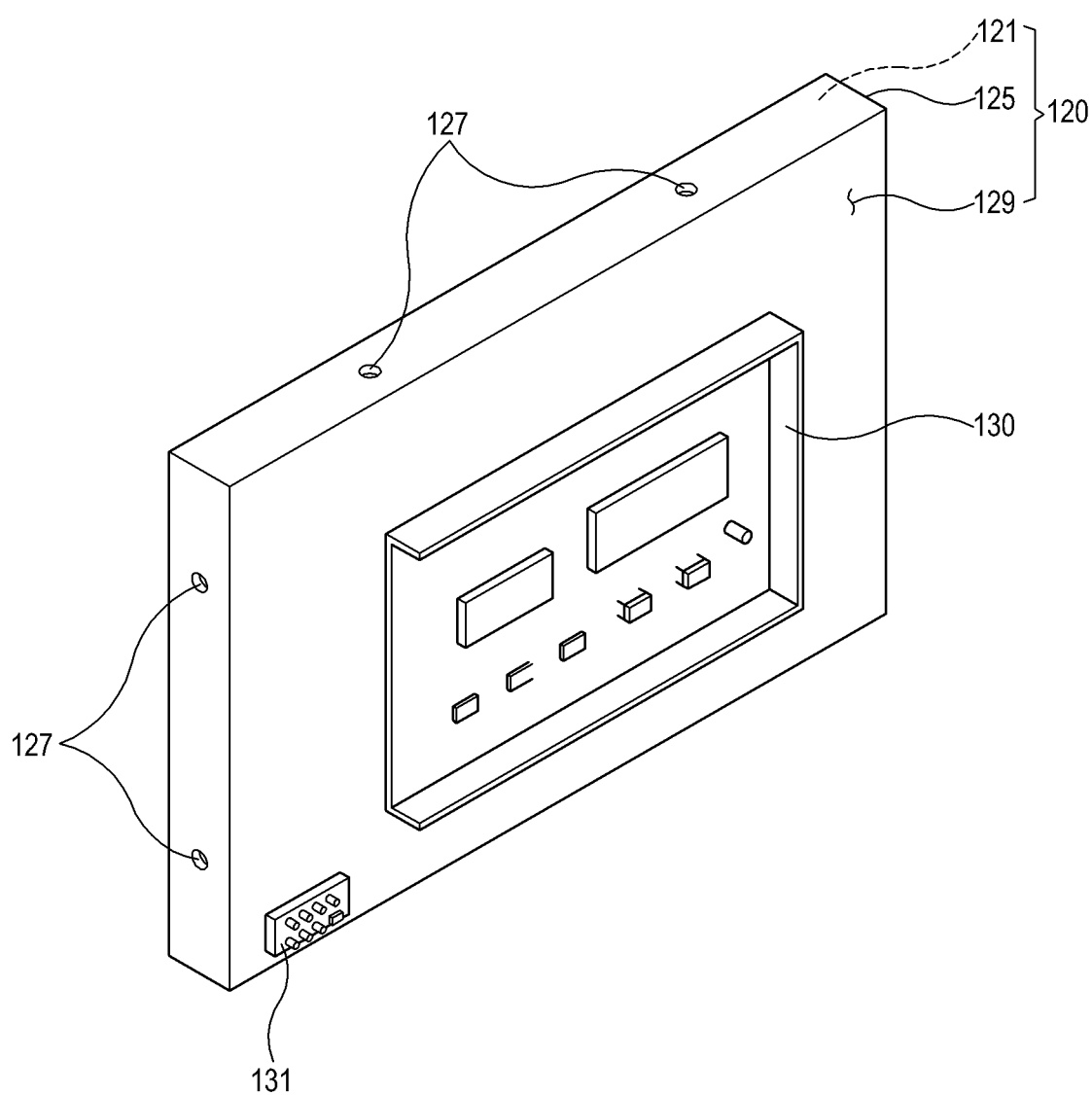
FIGS. 4A and 4B are perspective views illustrating an assembling process of the display apparatus in FIG. 1.
Figure 4B:
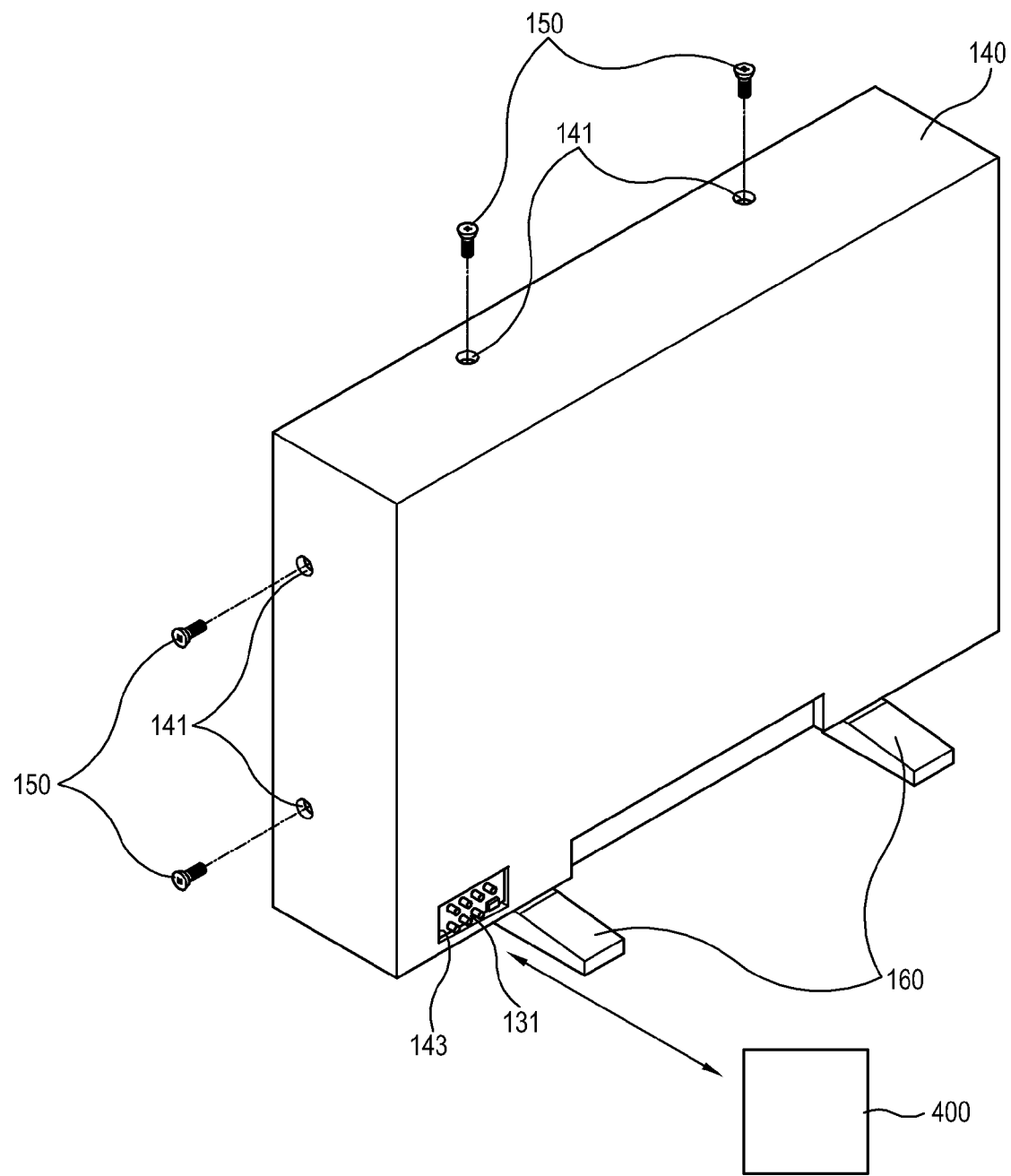

First, as illustrated in FIG. 4A, the printed circuit board 130 is coupled to the rear surface 129 of the display module 110 in a state where the opening 123 of the display module 110 is directed frontward.

Next, as illustrated in FIG. 4B, the rear cover 140 is arranged close to the side surface 125 of the display module 110 so that the coupling hole 127 of the display module 110 and the through hole 141 of the rear cover 140 correspond to each other. Then, the coupling member 150, such as a screw, is coupled into the through hole 141 and the coupling hole 127 to thereby couple the rear cover 140 to the display module 110.

With this process, assembling and disassembling of the rear cover 140 can be easily accomplished.

Figure 5:
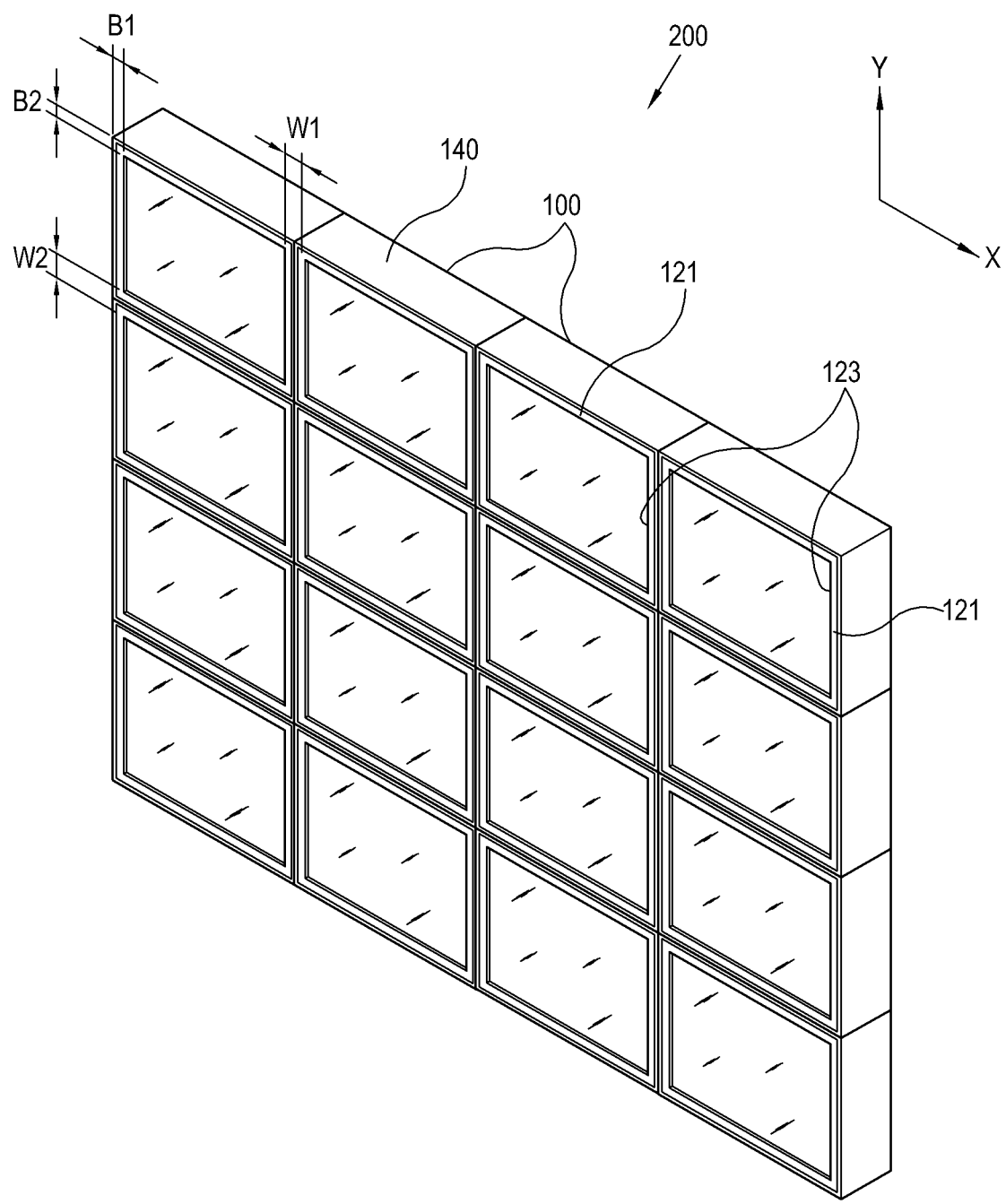
FIG. 5 is a perspective view of a multi display apparatus according to an exemplary embodiment of the present general inventive concept.

FIG. 5 illustrates a multi display apparatus 200 in which the plurality of display apparatuses 100 are coupled with each other in an X direction and a Y direction. In this example, four rows of display apparatuses 100 are arranged in the X direction, and similarly, four columns of display apparatuses 100 are arranged in the Y direction.

Here, since the first and second widths B1 and B2 of the non-display area of each display apparatus 100 are relatively narrow, widths W1 and W2 of a non-display area of the multi display apparatus 200 are also relatively narrow.

For example, in the 46 inch display apparatus 100, the widths W1 and W2 in the multi display apparatus 200 according to an embodiment of the present general inventive concept may be approximately 20 mm, whereas the corresponding widths in the conventional multi display apparatus are 30-35 mm.

With this configuration, the multi display apparatus 200 according to an embodiment of the present general inventive concept can result in a superior picture quality.

As described above, according to the present general inventive concept, a structure to couple a rear cover of a display apparatus and to form an outside appearance thereof can be simplified, and accordingly, manufacturing costs can be decreased.

According to the present embodiment, the display module is disposed inside the rear cover. That is, the rear cover has a space to accommodate the display module, and side surfaces to surround the display module 110.

Further, electromagnetic waves can be effectively shielded by a metal rear cover without an additional EMI preventing element. The rear cover may have a material as an insulation member to prevent the electromagnetic waves.

Furthermore, the widths of a non-display area of a display apparatus and a multi display apparatus can become relatively narrow, thereby resulting in a superior picture quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus, comprising:
a display module having an opening through which an image is displayed and a non display area to form around the opening, comprising:
a display panel to display the image, and
a chassis to support the display panel, comprising a front surface which forms a front appearance of the display module, a side surface and a rear surface;
a rear cover directly coupled to a side surface of the display module; and
a printed circuit board to drive the display module and which is mounted on the rear surface of the chassis,
wherein the rear cover accommodates the printed circuit board and the display module,
wherein a plurality of coupling holes are formed in at least one side surface of the display panel and the chassis,
wherein a plurality of through holes are formed at the rear cover to correspond to the coupling holes, and
wherein the rear cover is coupled with the display module by a coupling means which is coupled into each coupling hole through the display module and each through hole.

2. The display apparatus according to claim 1, wherein the rear cover comprises metal.

3. The display apparatus according to claim 2, wherein the rear cover is press-formed.

4. The display apparatus according to claim 1, further comprising:
a switch part to receive a control signal to control power supplied to the display module and an operation signal to operate the display module, the switch part being coupled to the display module.

5. The display apparatus according to claim 1, further comprising:
a terminal part provided to receive power or a signal from the outside of the display module, the terminal part being coupled to at least one of the display module and the rear cover.

6. A multi display apparatus having a plurality of display apparatuses which are coupled with each other, each display apparatus comprising:
- a display module having an opening through which an image is displayed and a non-display area to form around the opening, comprising:
    - a display panel to display the image, and
    - a chassis to support the display panel, comprising a front surface which forms a front appearance of the display module, a side surface and a rear surface;
- a rear cover directly coupled to a side surface of the display module; and
- a printed circuit board to drive the display module and which is mounted on the rear surface of the chassis,
- wherein the rear cover accommodates the printed circuit board and the display module,
- wherein a plurality of coupling holes are formed in at least one side surface of the display panel and the chassis,
- wherein a plurality of through holes are formed at the rear cover to correspond to the coupling holes, and
- wherein the rear cover is coupled with the display module by a coupling means which is coupled into each coupling hole through the display module and each through hole.

7. The multi display apparatus according to claim 6, wherein the rear cover comprises metal.

8. The multi display apparatus according to claim 7, wherein the rear cover is press-formed.

9. The display apparatus of claim 6, further comprising:
- a terminal part located on a surface of the display apparatus to couple signal sending/receiving cords thereto; and
- a terminal opening located on a surface of the rear cover to correspond to the terminal part to allow the signal sending/receiving cords to have access to the terminal part.

10. The display apparatus of claim 6, wherein the rear cover fully covers every side of the display apparatus except the side with the screen.

11. A multi display apparatus, comprising:
- a plurality of display modules, each comprising:
    - a display panel to display the image,
    - a chassis to support the display panel, comprising a front surface which forms a front appearance of the display module, a side surface and a rear surface,
    - a screen to display an image thereon, and
    - at least one coupling hole on at least one side surface of the display module;
- a rear cover with at least one through hole to correspond to the at least one coupling hole to couple the rear cover to the display module, such that each of the plurality of display modules are coupled to at least one other display module; and
- a printed circuit board to drive the display module and which is mounted on the rear surface of the chassis,
- wherein the rear cover accommodates the printed circuit board and the display module,
- wherein a plurality of coupling holes are formed in at least one side surface of the display panel and the chassis,
- wherein a plurality of through holes are formed at the rear cover to correspond to the coupling holes, and
- wherein the rear cover is coupled with the display module by a coupling means which is coupled into each coupling hole through the display module and each through hole.

12. A display apparatus, comprising:
- a display module having a display panel and a terminal part, comprising:
    - a display panel to display the image, and
    - a chassis to support the display panel, comprising a front surface which forms a front appearance of the display module, a side surface and a rear surface;
- a rear cover having a side surface to receive and surround the display module, and a terminal opening to receive the terminal part; and
- a printed circuit board to drive the display module and which is mounted on the rear surface of the chassis,
- wherein the rear cover accommodates the printed circuit board and the display module,
- wherein a plurality of coupling holes are formed in at least one side surface of the display panel and the chassis, and
- wherein a plurality of through holes are formed at the rear cover to correspond to the coupling holes, and
- wherein the rear cover is coupled with the display module by a coupling means which is coupled into each coupling hole through the display module and each through hole.

13. The display apparatus of claim 12, wherein the terminal part is exposed to an outside of the rear cover through the terminal opening so as to be connected to an external device.

14. The display apparatus of claim 12, wherein the display module comprises another side surface disposed within the side surface of the rear cover.

15. The display apparatus of claim 12, wherein the display module is disposed within the side surface of the rear cover.

16. The display apparatus of claim 12, wherein the display panel, the printed circuit board, and the terminal part are formed in a single body, and the single body is inserted into the rear cover.

* * * * *